United States Patent
Srivastava et al.

(10) Patent No.: US 12,022,316 B2
(45) Date of Patent: Jun. 25, 2024

(54) METHODS, SYSTEMS, AND COMPUTER READABLE MEDIA FOR OPTIMIZING NETWORK TRAFFIC DISTRIBUTION USING TIMESLOT-BASED TRACKED PRODUCER NETWORK FUNCTION (NF) PERFORMANCE DURING PRODUCER NF SELECTION

(71) Applicant: Oracle International Corporation, Redwood Shores, CA (US)

(72) Inventors: Ankit Srivastava, Gorakhpur (IN); Avinash Jha, Mumbai (IN); Anup Shivarajapura, Bangalore (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 310 days.

(21) Appl. No.: 17/356,461

(22) Filed: Jun. 23, 2021

(65) Prior Publication Data
US 2022/0417783 A1    Dec. 29, 2022

(51) Int. Cl.
H04W 28/02    (2009.01)
H04W 4/50    (2018.01)

(52) U.S. Cl.
CPC ......... H04W 28/0231 (2013.01); H04W 4/50 (2018.02)

(58) Field of Classification Search
CPC . H04W 28/0231; H04W 4/50; H04W 88/182; H04W 28/0289; H04L 47/10; H04L 47/826
See application file for complete search history.

(56) References Cited

U.S. PATENT DOCUMENTS 6,014,558 A    1/2000 Thomas
9,124,537 B2   9/2015 Kolze
(Continued)

FOREIGN PATENT DOCUMENTS

CN    105814931 A    7/2016
KR    20190057818 A    5/2019
(Continued)

OTHER PUBLICATIONS

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).
(Continued)

Primary Examiner — Mounir Moutaouakil
(74) Attorney, Agent, or Firm — Jenkins, Taylor & Hunt, P.A.

(57) ABSTRACT

A method for optimizing network traffic distribution using timeslot-based tracked producer network function (NF) performance during producer NF selection is performed at a service communication proxy (SCP) including at least one processor. The method includes tracking a performance characteristic of producer NFs across different timeslots. The method further includes receiving, from a consumer NF, a service based interface (SBI) service request. The method further includes identifying eligible producer NFs capable of handling the SBI service request. The method further includes selecting, from the eligible producer NFs, in a manner that at least partially overrides priorities of the eligible producer NFs, and based on the tracked performance characteristic across the different timeslots, a producer NF to handle the SBI service request. The method further includes forwarding the SBI service request to the producer NF.

18 Claims, 7 Drawing Sheets

(56) References Cited

U.S. PATENT DOCUMENTS

| | | | |
|---|---|---|---|
| 10,313,362 | B2 | 6/2019 | Ahuja et al. |
| 10,637,753 | B1 | 4/2020 | Taft et al. |
| 10,772,062 | B1 | 9/2020 | Albasheir et al. |
| 10,819,636 | B1 | 10/2020 | Goel |
| 11,109,307 | B2 | 8/2021 | Bartolome Rodrigo et al. |
| 11,330,027 | B1 * | 5/2022 | Khandekar .............. H04L 47/10 |
| 11,483,694 | B2 | 10/2022 | Krishan |
| 11,553,524 | B2 * | 1/2023 | Singh ...................... H04W 4/50 |
| 11,570,262 | B2 | 1/2023 | Sapra et al. |
| 11,671,369 | B2 * | 6/2023 | Rajput ................... H04L 67/566 370/235 |
| 11,716,252 | B2 * | 8/2023 | Rajput .................... H04L 67/30 370/220 |
| 2006/0010224 | A1 | 1/2006 | Sekar et al. |
| 2009/0222584 | A1 | 9/2009 | Josefsberg et al. |
| 2013/0080641 | A1 | 3/2013 | Lui et al. |
| 2013/0198269 | A1 | 8/2013 | Fleischman et al. |
| 2013/0272123 | A1 | 10/2013 | Lee et al. |
| 2016/0350683 | A1 | 12/2016 | Bester et al. |
| 2018/0262625 | A1 | 9/2018 | McCarley et al. |
| 2019/0212802 | A1 | 7/2019 | Srinivasan et al. |
| 2019/0230556 | A1 | 7/2019 | Lee |
| 2020/0137174 | A1 | 4/2020 | Stammers et al. |
| 2021/0007023 | A1 | 1/2021 | Umapathy et al. |
| 2021/0044481 | A1 | 2/2021 | Xu et al. |
| 2021/0385286 | A1 | 12/2021 | Wang et al. |
| 2022/0070648 | A1 | 3/2022 | Krishan |
| 2022/0131945 | A1 | 4/2022 | Sapra et al. |
| 2022/0287089 | A1 * | 9/2022 | Singh ..................... H04W 72/51 |
| 2023/0019209 | A1 * | 1/2023 | Rajput .................... H04L 43/10 |
| 2023/0022955 | A1 * | 1/2023 | Rajput .................. H04L 67/566 |
| 2023/0042219 | A1 * | 2/2023 | Singh ..................... H04W 48/16 |
| 2023/0072290 | A1 * | 3/2023 | Rajput ................ H04W 12/122 |
| 2023/0147549 | A1 * | 5/2023 | Singh ...................... H04L 69/40 709/223 |
| 2023/0217355 | A1 * | 7/2023 | Srivastava .............. H04L 69/40 370/329 |

FOREIGN PATENT DOCUMENTS

| | | |
|---|---|---|
| WO | WO 2019/144321 A1 | 8/2019 |
| WO | WO 2019/215308 A1 | 11/2019 |
| WO | WO 2021/047551 A1 | 3/2021 |
| WO | WO 2022/050987 A1 | 3/2022 |
| WO | WO 2022/093319 A1 | 5/2022 |

OTHER PUBLICATIONS

"3rd Generation Partnership Project; Technical Specification Group Services and System Aspects; Procedures for the 5G System (5GS); Stage 2 (Release 17)," 3GPP TS 23.502, V17.0.0, pp. 1-646.

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-163 (Mar. 2021).

Notification of Transmittal of the International Search Report and the Written Opinion of the International Searching Authority, or the Declaration for International Application No. PCT/US2022/033429 (dated Sep. 28, 2022).

Notice of Allowance and Fee(s) Due for U.S. Appl. No. 17/082,871 (dated Sep. 28, 2022).

Final Office Action for U.S. Appl. No. 17/082,871 (dated Jun. 6, 2022).

Notice of Allowance for U.S. Appl. No. 17/009,725 (dated Jun. 13, 2022).

Commonly-Assigned, co-pending U.S. Appl. No. 17/672,639 for "Methods, Systems, and Computer Readable Media for Dynamic Optimized Network Function Discovery for Consumer Network Functions" (Unpublished, filed Feb. 5, 2022).

"3rd Generation Partnership Project; Technical Specification Group Core Network and Terminals; 5G System; Network Function Repository Services, Stage 3 (Release 16)," 3GPP TS 29.510, V16.6.0, pp. 1-227 (Jan. 2021).

Notification of Transmittal of the International Search Report and the Written Opinion of the International Searching Authority, or the Declaration for International Application No. PCT/US2022/019848 (dated Jun. 14, 2022).

Non-Final Office Action for U.S. Appl. No. 17/082,871 (dated Feb. 7, 2022).

Commonly-Assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations" (Unpublished, filed Aug. 9, 2021).

Commonly-Assigned, Co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 6, 2021).

"3rd Generation Partnership Project; Technical Specification Group Services and System Aspects; Security architecture and procedures for 5G system (Release 17)," 3GPP TS 33.501, V17.3.0, pp. 1-258 (Sep. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

Office Action for Chinese Patent Application Serial No. 202180068287.X (dated Sep. 28, 2023).

Notice of Publication for European Patent Application Serial No. 21731870.8 (dated Aug. 9, 2023).

Notice of Publication for European Patent Application Serial No. 21718460.5 (dated Jun. 14, 2023).

* cited by examiner

METHODS, SYSTEMS, AND COMPUTER READABLE MEDIA FOR OPTIMIZING NETWORK TRAFFIC DISTRIBUTION USING TIMESLOT-BASED TRACKED PRODUCER NETWORK FUNCTION (NF) PERFORMANCE DURING PRODUCER NF SELECTION

TECHNICAL FIELD

The subject matter described herein relates to optimizing network traffic distribution. More particularly, the subject matter described herein relates to methods, systems, and computer readable media for optimizing network traffic distribution using timeslot-based tracked producer NF performance during producer NF selection.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G communications networks is that network traffic hotspots can develop during the day. 3GPP-defined NF discovery procedures do not provide an effective method for distributing traffic in a manner that avoids the traffic hotspots. For example 3GPP has a defined NF discovery service where consumer NF instances, in the case of non-delegated discovery, query an NRF for a set of NF profiles to handle a service request. In the case of delegated discovery, consumer NF instances send a service request to an SCP, and the SCP queries the NRF to obtain a list of eligible producer NFs capable of providing the service requested by the consumer NFs. In either case, time of day is not considered in selecting a producer NF to provide the service. Instead, producer NF profiles with priority values that are set by the NRF are returned in the discovery response. The SCP or consumer NF uses the priority values to select a producer NF for handling the service request.

Because producer NFs are selected based on priorities set by the NRF, traffic hotspots can develop at particular times of day, resulting in delayed handling of service requests and network congestion. For example, a producer NF near an office building may become overloaded during work hours, and a producer NF located near a sports arena may become overloaded during sporting events. The priorities set by the NRF are static and do not account for time of day traffic loading. As a result, high priority producer NFs can become overloaded, resulting in poor performance and delayed handling of service requests.

Accordingly, there exists a need for improved methods, systems, and computer readable media for selecting producer NF instances to handle service requests that consider performance characteristics of the producer NFs at particular times of day or other suitable timeslots.

SUMMARY

A method for optimizing network traffic distribution using timeslot-based tracked producer network function (NF) performance during producer NF selection is performed at a service communication proxy (SCP) including at least one processor. The method includes tracking a performance characteristic of producer NFs across different timeslots. The method further includes receiving, from a consumer NF, a service based interface (SBI) service request. The method further includes identifying eligible producer NFs capable of handling the SBI service request. The method further includes selecting, from the eligible producer NFs, in a manner that at least partially overrides priorities of the eligible producer NFs, and based on the tracked performance characteristic across the different timeslots, a producer NF to handle the service request. The method further includes forwarding the SBI service request to the producer NF.

According to another aspect of the subject matter described herein, tracking the performance characteristic of the producer NFs includes tracking at least one of load, latency, and SBI request success rate of each of the producer NFs across the different timeslots.

According to another aspect of the subject matter described herein, tracking the performance characteristic of the producer NFs across different timeslots includes maintaining, at the SCP, a database that includes records corresponding to different timeslots that store, for each timeslot, identities of producer NFs and corresponding tracked values of the performance characteristic.

According to another aspect of the subject matter described herein, selecting the producer NF includes performing a lookup in the database for a record corresponding to a current timeslot, locating the record corresponding to the current timeslot, reading producer NF identities and corresponding tracked values of the performance characteristic from the record, and selecting the producer NF from the producer NF identities in the record based on the tracked values of the performance characteristic in the record.

According to another aspect of the subject matter described herein, tracking the performance characteristic of the producer NFs includes learning values of the performance characteristic across the timeslots.

According to another aspect of the subject matter described herein, learning values of the performance characteristic includes learning expected values of the performance characteristic for each timeslot.

According to another aspect of the subject matter described herein, identifying eligible producer NFs to handle the SBI service request includes transmitting, by the SCP, an NF discovery request message to an NF repository function (NRF) and receiving, from the NRF, an NF discovery response that includes NF profiles of the producer NFs eligible to handle the service request.

According to another aspect of the subject matter described herein, tracking the performance characteristic of the producer NFs includes reading, from the NF profiles, attribute values that indicate measurements of the performance characteristic.

According to another aspect of the subject matter described herein, selecting a producer NF in a manner that at least partially overrides the priorities of the eligible producer NFs includes reading, from the NF profiles, priorities of the producer NFs and using the performance characteristic rather than the priorities from the NF profiles to select the producer NF to handle the SBI service request.

According to another aspect of the subject matter described herein, the method for optimizing network traffic distribution using timeslot-based tracked producer NF performance during producer NF selection includes receiving, at the SCP, initial SBI requests having first priority attribute value that is below an operator-defined threshold and initial SBI service requests having a second priority attribute value that is above the operator-defined threshold. The method further includes selecting producer NFs to process the initial SBI service requests having the first priority attribute value based on priorities of producer NFs received in an NFDiscover response and forwarding the initial SBI service requests having the first priority attribute value to the selected producer NFs. The method further includes selecting producer NFs to process the initial SBI requests having the second priority attribute value based on values of the performance characteristic for the producer NFs.

According to another aspect of the subject matter described herein, a system for optimizing network traffic distribution using timeslot-based tracked producer network function (NF) performance during producer NF selection is provided. The system includes a service communication proxy (SCP) including at least one processor. The system further includes a timeslot-based producer NF performance tracker implemented by the at least one processor for tracking a performance characteristic of producer NFs across different timeslots. The system further includes a producer NF selector implemented by the at least one processor for receiving, from a consumer NF, a service based interface (SBI) service request, identifying eligible producer NFs capable of handling the SBI service request, selecting, from the eligible producer NFs, in a manner that at least partially overrides priorities of the eligible producer NFs, and based on the tracked performance characteristic across the different timeslots, a producer NF to handle the SBI service request, and forwarding the SBI service request to the producer NF.

According to another aspect of the subject matter described herein, the timeslot-based producer NF performance tracker is configured to track at least one of load, latency, and SBI request success rate of each of the producer NFs across the different timeslots.

According to another aspect of the subject matter described herein, the timeslot-based producer NF performance tracker is configured to maintain, at the SCP, a database that includes records corresponding to different timeslots that store, for each timeslot, identities of producer NFs and corresponding tracked values of the performance characteristic.

According to another aspect of the subject matter described herein, the producer NF selector, in selecting the producer NF, is configured to perform a lookup in the database for a record corresponding to a current timeslot, locate the record corresponding to the current timeslot, read producer NF identities and corresponding tracked values of the performance characteristic from the record, and select the producer NF from the producer NF identities in the record based on the tracked values of the performance characteristic in the record.

According to another aspect of the subject matter described herein, the timeslot-based producer NF performance tracker is configured to learn expected values of the performance characteristic across the timeslots.

According to another aspect of the subject matter described herein, the timeslot-based producer NF performance tracker is configured to identify eligible producer NFs to handle the SBI service request by transmitting an NF discovery request message to an NF repository function (NRF), and receiving, from the NRF, an NF discovery response that includes NF profiles of the producer NFs eligible to handle the SBI service request.

According to another aspect of the subject matter described herein, the timeslot-based producer NF performance tracker is configured to read, from the NF profiles, attribute values that indicate measurements of the performance characteristic.

According to another aspect of the subject matter described herein, the producer NF selector is configured to select a producer NF in a manner that at least partially overrides the priorities of the producer NFs by reading, from the NF profiles, priorities of the producer NFs and using the performance characteristic rather than the priorities from the NF profiles to select the producer NF to handle the SBI service request.

According to another aspect of the subject matter described herein, the producer NF selector is configured to receive initial SBI requests having a first priority attribute value that is below an operator-defined threshold and initial SBI service requests having a second priority attribute value that is above the operator-defined threshold, select producer NFs to process the initial SBI service requests having the first priority attribute value based on priorities of producer NFs received in an NFDiscover response and forwarding the initial SBI requests having the first priority attribute value to the selected producer NFs, and select producer NFs to process the initial SBI service requests having the second priority attribute value based on the tracked performance characteristic for the producer NFs.

According to another aspect of the subject matter described herein, a non-transitory computer readable medium having stored thereon executable instructions that when executed by a processor of a computer control the computer to perform steps at a service communication proxy (SCP) is provided. The steps include tracking a performance characteristic of producer network functions (NFs) across different timeslots. The steps further include receiving, from a consumer NF, a service based interface (SBI) service request. The steps further include identifying eligible producer NFs capable of handling the SBI service request. The steps further include selecting, from the eligible producer NFs, in a manner that at least partially overrides priorities of the eligible producer NFs, and based on the tracked performance characteristic across the different timeslots, a producer NF to handle the SBI service request. The steps further include forwarding the SBI service request to the producer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
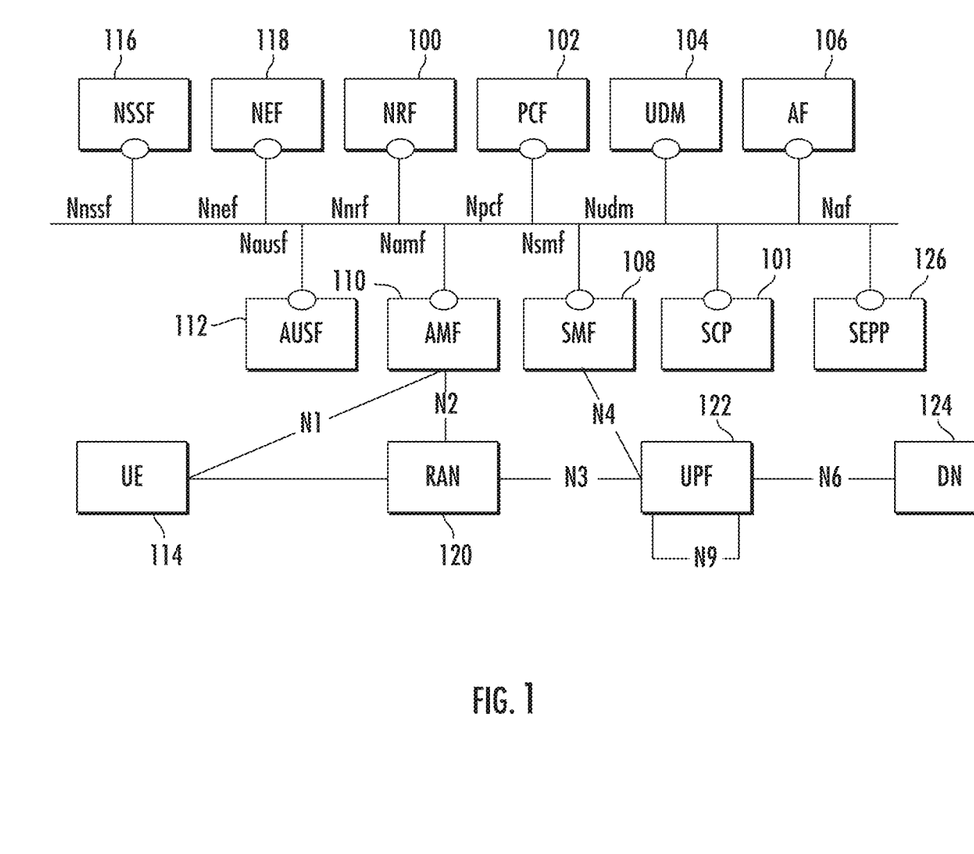
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address. In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
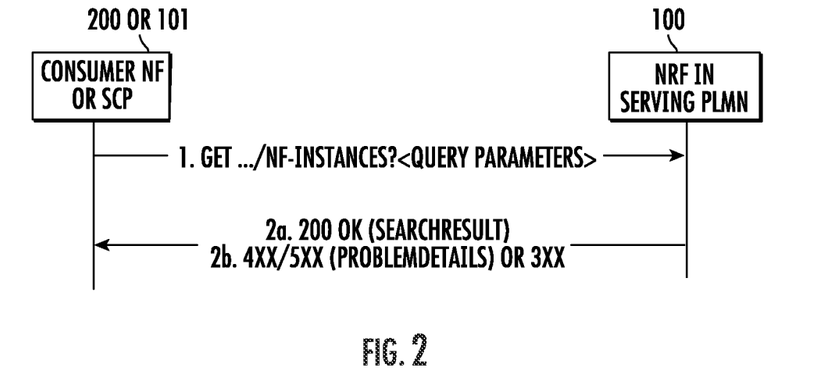
FIG. 2 is a message flow diagram illustrating exemplary messages exchanged between an NF service consumer or SCP and an NRF for the NF discovery service.

As stated above, one problem that can occur in 5G networks is that producer NFs can become overloaded as traffic hotspots develop at different times of day. 3GPP TS 29.510 in Table 6.2.3.2.1-1 defines query parameters that can be used in an NF discovery request for identifying producer NFs to handle the discovery request. FIG. 2 illustrates the NF discovery procedure defined in 3GPP TS 29.510. Referring to FIG. 2, in line 1 of the message flow diagram, a consumer NF 200 or SCP 101 sends an NF discovery request message to NRF 100 to discover producer NF instances capable of providing a service needed by the consumer NF. The NF discovery request is a hypertext transfer protocol (HTTP) GET message with query parameters that NRF 100 uses to select NF profiles of producer NF instances to return to NF service consumer 200 or SCP 101. Examples of query parameters that may be included in the NF discovery request from Table 6.2.3.2.3.1-1 of 3GPP TS 29.510 include NF type, which identifies the NF type of the target NF being discovered, preferred locality, which identifies a preferred locality from the perspective of the consumer NF, etc. However, none of the parameters in Table 6.2.3.2.3.1-1 are usable to obtain tracked producer NF performance at particular times of day for consideration in the NF discovery or selection process.

Returning to the message flow in FIG. 2, In line 2a, NRF 100 sends a discovery response to consumer NF 200 or SCP 101. The NF discovery response includes a list or array of NF profiles matching the query parameters in the NF discovery request. The NF profile is a data structure defined in Table 6.1.6.2.2-1 of 3GPP TS 29.510. One parameter that can be returned in the NF profile is a priority parameter, which contains a priority value (lower values mean higher priority or more preferred), which the consumer NF or SCP uses to select among producer NFs of the same type. Table 1 shown below illustrates the definition of the priority parameter or attribute that can be returned in an NF profile in a discovery response.

TABLE 1

NF Profile Priority Attribute

| Attribute Name | Data Type | P | Cardinality | Description |
|---|---|---|---|---|
| priority | integer | O | 0 . . . 1 | Priority (relative to other NFs of the same type) within the range 0 to 65535, to be used for NF selection; lower values indicate a higher priority. Priority may or may not be present in the nfServiceList parameters, xxxInfo parameters and in this attribute. Priority in the nfServiceList has precedence over the priority in this attribute, which has precedence over the priority in xxxInfo parameter. (NOTE 4). The NRF may overwrite the received priority value when exposing an NFProfile with the Nnrf_NFDiscovery service. |

When a consumer NF or SCP receives an NF profile with a priority attribute value, the consumer NF or SCP uses the priority attribute value to select the highest priority producer NF to process a service based interface (SBI) request and sends the SBI request to the selected producer NF. Using the priority attribute set by the NRF alone does not consider producer NF performance characteristics that may change across different times of day.

As indicated above, traffic hotspots across the network vary throughout the day. For example, producer NFs located in commercial areas are heavily loaded with traffic during office hours. Producer NFs located in residential areas are heavily loaded with traffic after office hours. Producer NF instances outside of traffic hotspot area are less busy compared to producer NFs in the traffic hotspot area. When producer NF instances in the traffic hotspot area are marked as high priority in the NF discovery response, then all of the traffic will route to the high-priority producer NFs, which are at risk of overload. "Time of the day" is an important factor for producer NF instance selection to proactively distribute the traffic across the network and avoid overload. 3GPP producer NF selection procedures do not consider "time of the day" during producer NF selection to control the traffic towards the producer NFs.

Figure 3:
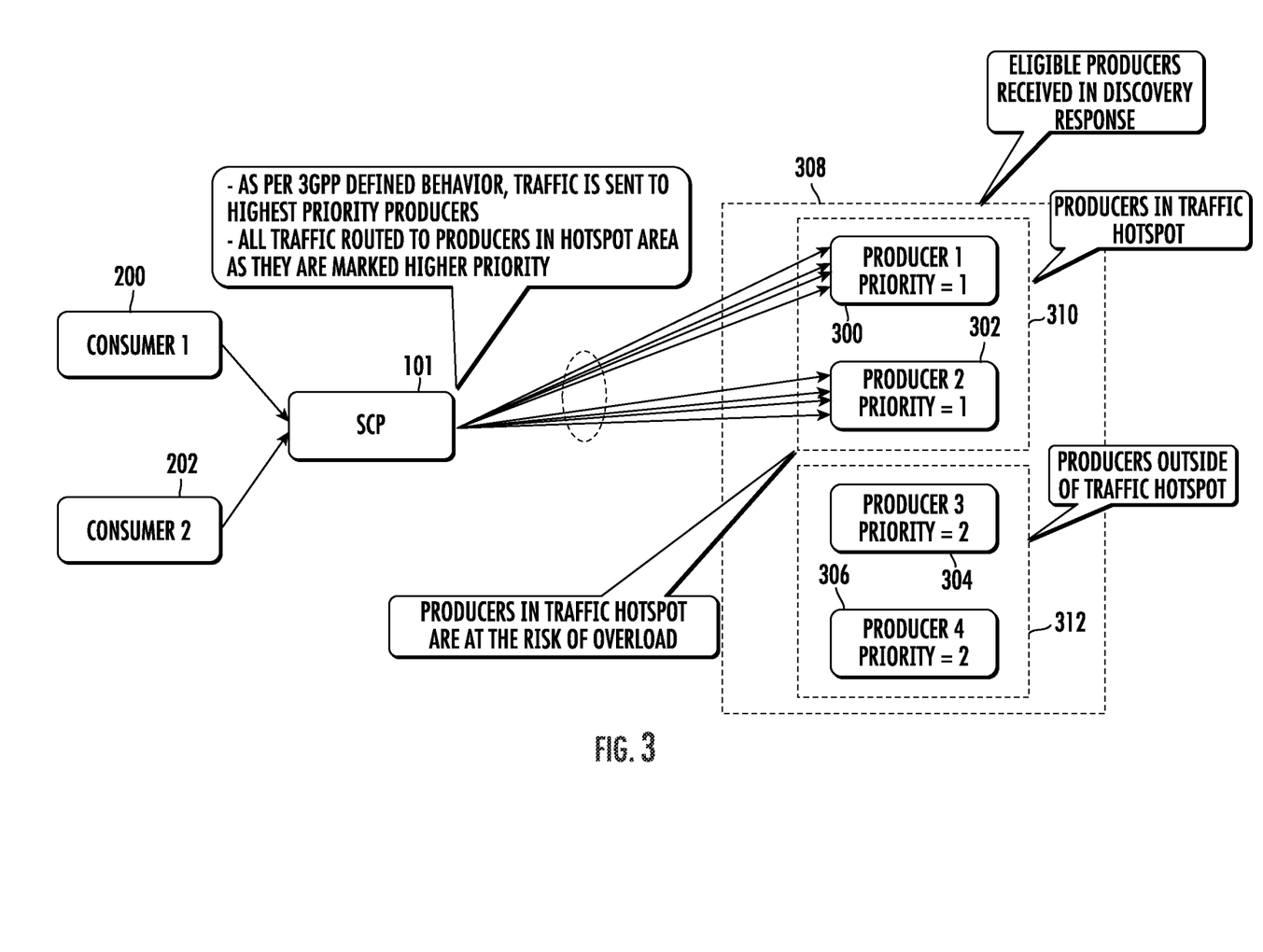
FIG. 3 is a network diagram illustrating a problem that can occur when a high priority producer NF becomes a traffic hotspot during a particular time of day.

FIG. 3 is a network diagram illustrating the results of routing traffic to producer NFs based on priority and without considering producer NF performance characteristics at different times of day. Referring to FIG. 3, consumer NFs 200 and 202 are connected to producer NFs 300, 302, 304, and 306 via an intermediate SCP 101, which routes service requests to producer NFs 300, 302, 304, and 306. The communication model where consumer NFs 200 and 202 are connected to producer NFs 300, 302, 304, and 306 via an intermediate SCP is referred to in 3GPP TS 29.501 as the indirect communications model. SCP 101 may also perform producer NF discovery on behalf of consumer NFs 200 and 202. The case where SCP 101 performs producer NF discovery on behalf of consumer NFs 200 and 202 is referred to in 3GPP TS 29.501 as delegated discovery.

In FIG. 3, box 308 represents producer NFs identified in a discovery response that are eligible to provide the service requested in a service request from one of consumer NFs 200 and 202. Box 310 represents producer NFs that are currently in a traffic hotspot. Box 312 represents producer NFs that are outside of the traffic hotspot.

When SCP 101 receives a discovery response, the discovery response includes the NF profiles of eligible producer NFs 300, 302, 304, and 306. Because producer NFs 300 and 302 have lower priority values than producer NFs 304 and 306, SCP 101 routes service requests to producer NFs 300 and 302 and not to producer NFs 304 and 306. As a result, producer NFs 300 and 302 can become overloaded, even though producer NFs 304 and 306 may have capacity to handle the service requests.

In order to avoid or reduce the likelihood of the scenario illustrated in FIG. 3, the SCP tracks performance characteristics of producer NFs across different timeslots during the day. A timeslot is an operator-defined interval of time during which the SCP tracks producer NF performance and records the tracked performance in a record in associated with the timeslot in a database. Within a timeslot, the SCP is aware of the performance characteristics of the producer NFs. The SCP determines eligible producer NF instances for handling an SBI service request based on the NF discovery response. The SCP routes the traffic to the highest priority producer NFs identified in the NF discovery response. For some SBI service requests, the SCP overrides the priorities of producer NF instances in the NF discovery response from the NRF based on the performance characteristic of producer NF instances tracked by the SCP for the given timeslot of the day. When the highest priority producer NFs identified in the NF discovery response are approaching overload (which means they are in a traffic hotspot), the SCP overrides the priorities of other producer NFs in the discovery response (which are marked as lower priority). When overriding the priorities of the producer NFs, the SCP considers the performance characteristic(s) of producer NFs in the current timeslot. The SCP routes the higher priority initial requests towards the producer NF instances which are marked as higher priority in the discovery response. The SCP routes the lower priority initial requests towards the other producer instances for which it overrides the priority as mentioned above.

An initial request is a first SBI request message associated with a service transaction provided by a producer NF. Initial requests can be sent to any producer NF capable of providing the requested service. Subsequent requests are SBI request messages relating to an existing transaction for which an initial request has been sent to a particular producer NF. Subsequent requests are typically routed to the same producer NF that processed the initial request.

In one example, the SCP determines the priority of an initial request from the 3 gpp-Sbi-Message-Priority header in the initial request. The 3 gpp-Sbi-Message-Priority header is defined in section 5.3.2.2 of 3GPP TS 29.500 and contains a priority value from 0 to 31, with lower priority values indicating higher priority messages. A network operator may define a threshold value, such as 5, above which initial requests are routed to lower priority producer NFs whose priority is overridden by the tracked performance characteristic in the current timeslot. If an initial SBI request has a 3 gpp-Sbi-Message-Priority header with a value less than or equal to the threshold, the initial SBI request may be routed to the higher priority producer NFs without regard to the tracked performance characteristic of the producer NFs in the current timeslot. The SCP routes subsequent request messages relating to the same service as an initial request message to the producer NF that handled the initial request.

Using this methodology, traffic is distributed across producer NF instances in and outside of traffic hotspot areas. The occurrences of overloading of producer NF instances in traffic hotspot areas is reduced. In one example, the SCP may divide a day into different timeslots, such as Timeslot1, Timeslot2, Timeslot3, Timeslot4, etc., where a timeslot is any suitable operator-defined time interval. The SCP tracks the producer NFs' performance characteristics (such as load, latency, and/or SBI request success rate) across different timeslots. Table 2 shown below illustrates an example of a performance characteristic that may be tracked across different timeslots during the day.

TABLE 2

Tracked Producer NF Performance Characteristic Across Timeslots

| Timeslots | Producer NF Instances | Load (in %) |
|---|---|---|
| Timeslot 1 | Producer NF1 | 60 |
| | Producer NF2 | 70 |
| | Producer NF3 | 20 |
| | Producer NF4 | 30 |
| Timeslot 2 | Producer NF3 | 70 |
| | Producer NF4 | 60 |
| | Producer NF1 | 30 |
| | Producer NF2 | 20 |

From Table 2, in Timeslot1, the producer NFs NF1-NF4 respectively have loads of 60%, 70%, 20% and 30%. In Timeslot2, the loads of producer NFs NF1-NF4 have shifted to 30%, 20%, 70%, and 60%, respectively. SCP 101 may track the performance characteristics of the producer NFs and maintain an in-memory database indexed by timeslot identifiers so that the NF discovery process can obtain the values of the performance characteristic for the producer NFs using a single lookup. By tracking the load of the NFs across different timeslots in a day and maintaining a database including information, such as that illustrated in Table 2, the SCP can increase the efficiency of producer NF selection. For example, the producer NF selection process performed by the SCP may include looking up an identifier for the current timeslot in the database, reading the tracked values of the performance characteristic, and using the values of the performance characteristic to override producer NF priorities received in the NF discovery response. In one example, the tracked values of the performance characteristic may be continually updated by a process executed in the SCP that is independent of the process in the SCP that performs producer NF selection, further increasing the speed and/or efficiency of producer NF selection.

The values of the tracked producer NF performance characteristic may, in one example, be learned expected values of the characteristic during timeslots tracked across different days or other suitable time period. For example, the tracked values may be running average values of the performance characteristic for each timeslot that are updated continually or periodically by the tracking process. Using learned expected values of the performance characteristic may smooth the shifts or changes in producer NF loading that occur due to overriding of the priority values and may also be useful in anticipating and avoiding producer NF overloading.

Figure 4:
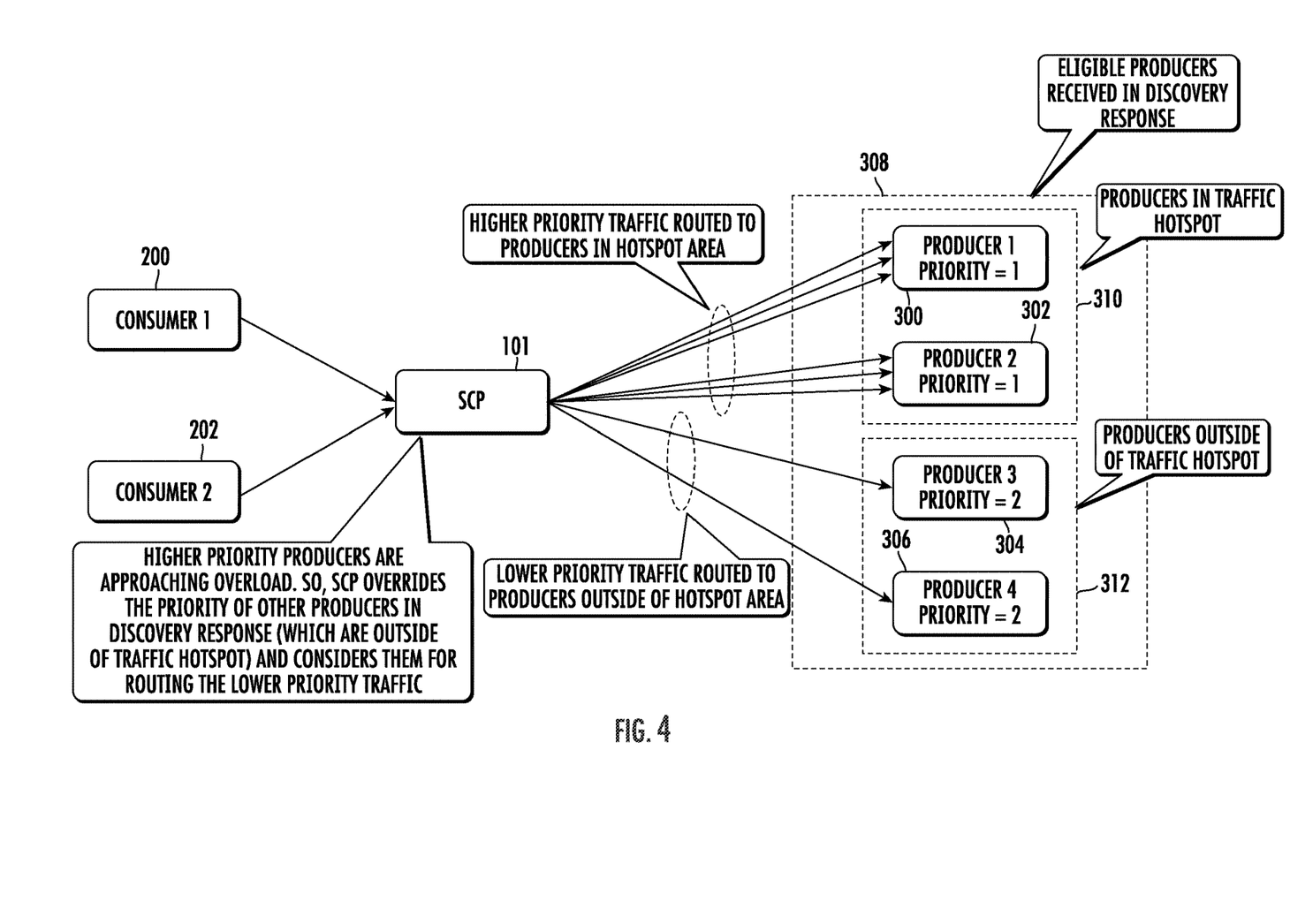
FIG. 4 is a network diagram illustrating the use of tracked producer NF performance information during particular timeslots to proactively select producer NFs to handle service requests in a manner that reduces the likelihood of overloading the producer NFs.

FIG. 4 is a network diagram illustrating the same network in FIG. 3 where consumer NFs 200 and 202 are connected to producer NFs 300, 302, 304, and 306 via an intermediate SCP 101, which routes service requests to producer NFs 300, 302, 304, and 306. SCP 101 may also perform NF discovery on behalf of consumer NFs 200 and 202 if delegated discovery is implemented. As with the example illustrated in FIG. 3, box 308 represents producer NFs identified in an NF discovery response that are eligible to provide the service requested in an SBI service request from one of consumer NFs 200 and 202. Box 310 represents producer NFs that are currently in a traffic hotspot. Box 312 represents producer NFs that are outside of the traffic hotspot.

Producer NFs 300 and 302 located in the traffic hotspot have lower (more preferred) priority values than producer NFs 304 and 306 that are outside of the traffic hotspot. Rather than routing all service requests to producer NFs 300 and 302 with the lowest priority values, SCP 101 may proactively route certain traffic to producer NFs 304 and 306 outside of the traffic hotspot based on the tracked performance of producer NFs 300, 302, 304, and 306 at different times of day. SCP 101 may override the priority values of producer NFs received in the NF profiles from the NRF and consider lower priority producer NFs 304 and 306 for traffic with priority attribute values above an operator defined threshold. In one example, SCP 101 may continue to route high priority (i.e., traffic with priority attribute values below the operator-defined threshold) traffic to producer NFs 300 and 302 in the traffic hotspot. Lower priority traffic may be routed to producer NFs 304 and 306 that are outside of the traffic hotspot.

Figure 5:
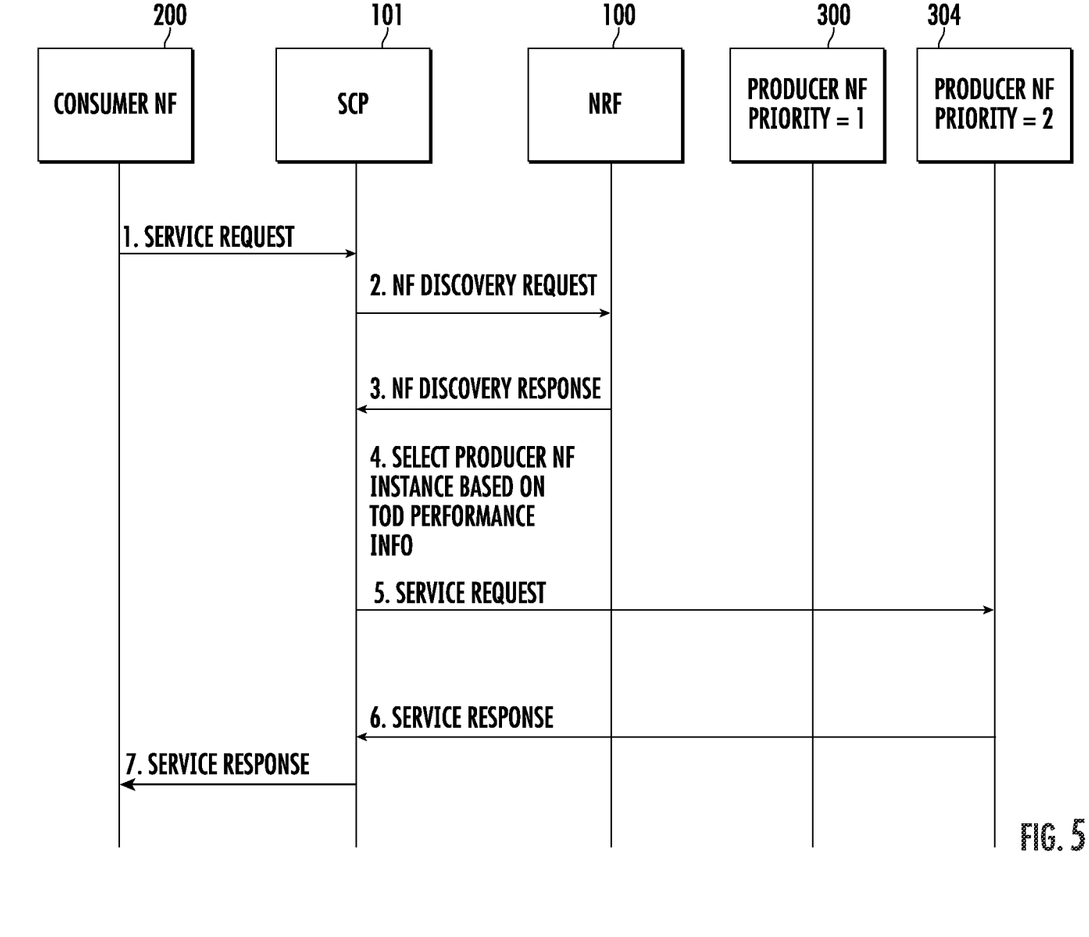
FIG. 5 is a message flow diagram illustrating exemplary messages exchanged for the case of delegated discovery where tracked producer NF performance information during particular timeslots is used in producer NF selection.

FIG. 5 is a message flow diagram illustrating exemplary messages exchanged for producer NF discovery and selection using producer NF performance information tracked or learned across different timeslots. Referring to FIG. 5, in line 1, consumer NF 200 sends an SBI service request to SCP 101. The SBI service request includes one or more parameters that enables SCP 101 to formulate an NF discovery request to discover producer NFs that are capable of providing the service requested in the SBI service request.

In line 2 of the message flow diagram, SCP 101 formulates and sends an NF discovery request to NRF 100. The NF discovery request includes service identifying parameters obtained from the SBI service request in line 1. NRF 100 receives the NF discovery request and performs a lookup in its NF profiles database to identify NF profiles of producer NFs that are capable of providing the service requested by consumer NF 200. In line 3 of the message flow diagram, NRF 100 sends an NF discovery response message to SCP 101. The NF discovery response includes an array of NF profiles matching the query parameters in the discovery request. The NF profiles include the priority attributes described above, which indicate the relative priorities of the producer NFs and that would normally be used for NF selection by the receiving consumer NF or SCP without considering timeslot-based performance metrics of the producer NFs.

Figure 6:
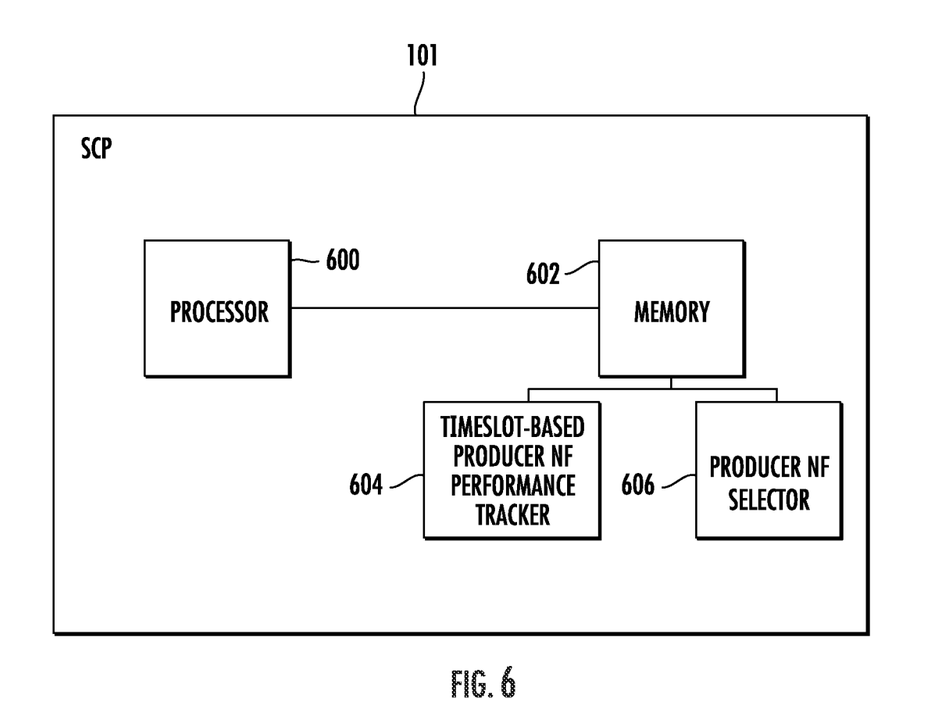
FIG. 6 is a block diagram of an SCP that tracks producer NF performance characteristics across different timeslots and uses the tracked producer NF performance information to select a producer NF to handle a servicer request.

However, rather than only using the priority information returned by the NRF in the discovery response, SCP 101 selects, in step 4, a producer NF based on producer NF performance information tracked across timeslots at different times of day. An example of the information that can be used is illustrated above in Table 2. If the SBI service request is an initial request, SCP 101 may determine whether the value of the priority attribute specified in the request is below an operator-defined threshold (lower priority values indicate higher priority messages). If the priority attribute value in the message is below an operator-defined threshold, then the message is a high-priority message, and the message may be routed to the high-priority producer NFs, such as producer NF 300. If the priority is above an operator-defined threshold, the message is a low priority message, and SCP 101 overrides the priorities for the producer NFs specified in the discovery response by selecting a producer NF based on the tracked performance characteristic of the producer NF across different times of day. In the illustrated example, SCP 101 selects producer NF 304, and, in line 5, sends a service request message to the selected producer NF. It should be noted that SCP 101 selects producer NF 304 over producer NF 300, even though producer NF 304 has a higher (less preferred) priority attribute value than producer NF 300. In line 6 of the message flow diagram, producer NF 304 sends a service response message to SCP 101. In line 7 of the message flow diagram, SCP 101 sends the service response to consumer NF 200. Thus, FIG. 5 illustrates the case for indirect communication with delegated discovery where learned or tracked producer NF performance information across different times of day is used to override priorities of producer NFs specified in NF profiles returned by the NRF FIG. 6 is a block diagram illustrating an exemplary architecture for an SCP for performing timeslot-based producer NF performance tracking and producer NF selection using the learned timeslot-based performance information. Referring to FIG. 6, SCP 101 includes at least one processor 600 and a memory 602. SCP 101 further includes a timeslot-based producer NF performance tracker 604 and producer NF selector 606. Timeslot-based producer NF performance tracker 604 may track and/or learn performance characteristics of producer NFs across timeslots, such as different time intervals of a day. Producer NF performance may be tracked and/or learned from values of capacity and overload attributes received in NF discovery responses, from capacity and/or overload control information received in responses to SBI service requests, measured latency in processing SBI service requests, and/or based on SBI request success rates. Producer NF selector 606 performs producer NF selection from the NF profiles of the set of eligible producer NFs received from NRF 100 in a discovery response. Producer NF selector 606 may override the priorities of the producer NFs received in the NF discovery response for initial requests when a producer NF is determined to be in an overloaded state or approaching an overloaded state. Timeslot-based producer NF performance tracker 604 and producer NF selector 606 may, in one example, be implemented using computer executable instructions stored in memory 602 an executed by processor 600. As stated above, in one example, timeslot-based producer NF performance tracker 604 and producer NF selector 606 may be independent processes, where timeslot-based producer NF performance tracker 604 continually tracks and updates values of the tracked performance characteristic in an in-memory database, and producer NF selector 606 accesses the database by performing a lookup using an identifier for a current timeslot or the current time as a lookup key. If the current time is used as the lookup key, entries in the database may be indexed by ranges of time values that correspond to each timeslot.

Figure 7:
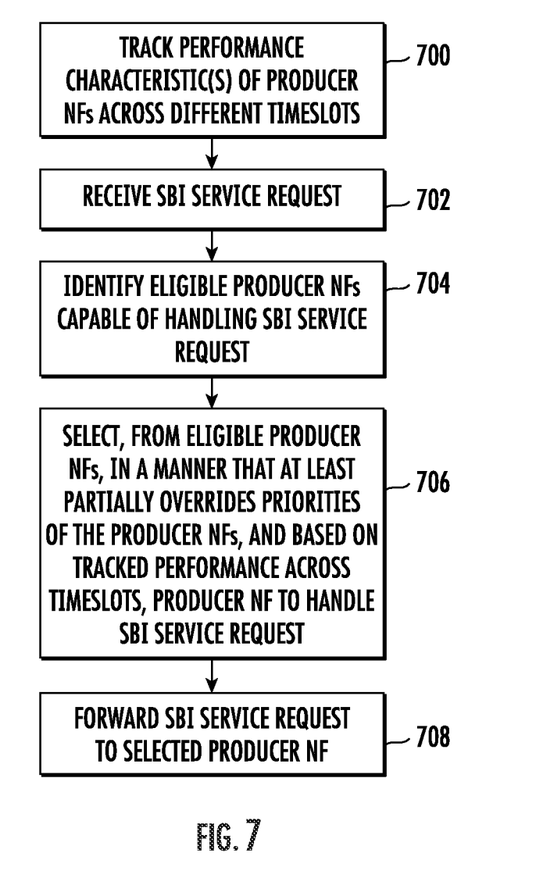
FIG. 7 is a flow chart illustrating an exemplary process for tracking and using tracked producer NF performance information across different timeslots to select a producer NF for handling a service request.

FIG. 7 is a flow chart illustrating an exemplary process for selecting producer NF instances to handle SBI service requests in a manner that at least partially overrides priorities of the producer NFs and that uses tracked performance of the producer NFs across different timeslots. Referring to FIG. 7, in step 700, performance characteristics of producer NFs are tracked across different timeslots. In one example, latency, load, overload status, and/or SBI request success rate may be tracked using attributes received in discovery responses from the NRF concerning the producer NFs. In another example, the performance characteristics can be tracked based on load and overload information carried in responses to service requests received from the producer NFs. The performance characteristics may be tracked across different timeslots during a day, as illustrated above with regard to Table 2. The tracked performance characteristics in one example may be learned performance characteristics, such as average performance characteristics learned across different days (or other operator-defined time periods).

In step 702, the process includes receiving an SBI service request. For example, SCP 101 may receive, from a consumer NF, and SBI service request that includes one or more query parameters identifying the requested service and/or producer NF type.

In step 704, the process includes identifying eligible producer NFs capable of handling the SBI service request. The eligible producer NFs capable of handling the producer NFs may be identified from the set of NF profiles returned in the discovery response from the NRF.

In step 706, the process includes selecting, from the eligible producer NFs, in a manner that at least partially overrides priorities of the producer NFs, and based on the tracked performance characteristics across different timeslots, a producer NF to handle the SBI service request. For example, SCP 101 may use the tracked performance characteristics to select an eligible producer NF to handle an initial SBI service request of an operator defined priority or less that overrides the priorities of the producer NFs specified in the NF profiles.

In step 708, the SBI service request is forwarded to the producer NF. For example, SCP 101 may forward the SBI service request to the producer NF selected in step 706.

The subject matter described herein enables optimal utilization of network resources irrespective of changing traffic hotspots across the day or other time period. The likelihood of optimal distribution of traffic across producer NFs in the network is also increased. Lower priority traffic is handled by producer NF instances outside of traffic hotspots. Forwarding the lower priority traffic to producer NF instances outside of traffic hotspots frees up producer NF instances in traffic hotspots for processing higher priority traffic, which improves response delay, traffic success rate, round trip latency, and key performance indicators (KPIs) and enables compliance with service level agreements (SLAs). The subject matter described herein reduces the likelihood of overloading a producer NF instance in traffic hotspots. Network resiliency is also enhanced by reducing occurrences of producer NF overloading. This approach may also reduce the operating cost for mobile virtual network operators (MVNOs) and networks deployed in public clouds by avoiding unnecessary scale-out of producer NFs in traffic hotspots.

The disclosure of each of the following references is hereby incorporated herein by reference in its entirety.

REFERENCES

1. $3^{rd}$ Generation Partnership Project; Technical Specification Group Core Network and Terminals; 5G System; Technical Realization of Service Based Architecture; Stage 3 (Release 17) 3GPP TS 29.500 V17.2.0 (2021-03).
2. $3^{rd}$ Generation Partnership Project; Technical Specification Group Services and System Aspects; System architecture for the 5G System (5GS); Stage 2 (Release 17) 3GPP TS 23.501 V17.0.0 (2021-03).
3. $3^{rd}$ Generation Partnership Project; Technical Specification Group Core Network and Terminals; 5G System; Network Function Repository Services; Stage 3 (Release 17) 3GPP TS 29.510 V17.1.0 (2021-03).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for optimizing network traffic distribution using timeslot-based tracked producer network function (NF) performance during producer NF selection, the method comprising:
   at a service communication proxy (SCP) including at least one processor:
   tracking a performance characteristic of producer NFs across different timeslots, wherein tracking the performance characteristic includes continually updating, by a tracking process, a value of the performance characteristic;
   maintaining a database record for each of the timeslots, where each database record includes a value indicating the timeslot, a plurality of producer NF identifiers, and the value of the performance characteristic for each of the producer NF identifiers during the timeslot and database records for different timeslots include the same producer NF identifiers;
   receiving, from a consumer NF, a service based interface (SBI) service request;
   identifying eligible producer NFs capable of handling the SBI service request;
   selecting, from the eligible producer NFs, in a manner that at least partially overrides priorities of the eligible producer NFs, and based on the tracked performance characteristic across the different timeslots, a producer NF to handle the SBI service request; and
   forwarding the SBI service request to the producer NF.

2. The method of claim 1 wherein tracking the performance characteristic of the producer NFs includes tracking at least one of load, latency, and SBI request success rate of each of the producer NFs across the different timeslots.

3. The method of claim 1 wherein selecting the producer NF includes performing a lookup in the database for a record corresponding to a current timeslot, locating the record corresponding to the current timeslot, reading producer NF identities and corresponding tracked values of the performance characteristic from the record, and selecting the producer NF from the producer NF identities in the record based on the tracked values of the performance characteristic in the record.

4. The method of claim 1 wherein tracking the performance characteristic of the producer NFs includes learning values of the performance characteristic across the timeslots.

5. The method of claim 4 wherein learning values of the performance characteristic includes learning expected values of the performance characteristic for each timeslot.

6. The method of claim 1 wherein identifying eligible producer NFs to handle the SBI service request includes:
   transmitting, by the SCP, an NF discovery request message to an NF repository function (NRF); and
   receiving, from the NRF, an NF discovery response that includes NF profiles of the producer NFs eligible to handle the SBI service request.

7. The method of claim 6 wherein tracking the performance characteristic of the producer NFs includes reading, from the NF profiles, attribute values that indicate measurements of the performance characteristic.

8. The method of claim 6 wherein selecting a producer NF in a manner that at least partially overrides a priority of the producer NFs includes reading, from the NF profiles, priorities of the NF profiles and using the performance characteristic rather than the priorities from the NF profiles to select the producer NF to handle the SBI service request.

9. The method of claim 1 comprising:
   receiving, at the SCP, initial SBI requests having a first priority attribute value that is below an operator-defined threshold and initial SBI service requests having a second priority attribute value that is above the operator-defined threshold;
   selecting producer NFs to process the initial SBI service requests having the first priority attribute value based on priorities of producer NFs received in an NFDiscover response and forwarding the initial SBI service requests having the first priority attribute value to the selected producer NFs; and
   selecting producer NFs to process the initial SBI requests having the second priority attribute value based on values of the performance characteristic for the producer NFs.

10. A system for optimizing network traffic distribution using timeslot-based tracked producer network function (NF) performance during producer NF selection, the system comprising:
   a service communication proxy (SCP) including at least one processor;
   a timeslot-based producer NF performance tracker implemented by the at least one processor for tracking a performance characteristic of producer NFs across different timeslots, wherein tracking the performance characteristic includes continually updating, by the timeslot-based producer NF performance tracker, value of the performance characteristic, wherein the timeslot-based producer NF performance tracker is configured for maintaining a database record for each of the timeslots, where each database record includes a value indicating the timeslot, a plurality of producer NF identifiers, and the value of the performance characteristic for each of the producer NF identifiers during the timeslot and database records for different timeslots include the same producer NF identifiers; and a producer NF selector implemented by the at least one processor for receiving, from a consumer NF, a service based interface (SBI) service request, identifying eligible producer NFs capable of handling the SBI service request, selecting, from the eligible producer NFs, in a manner that at least partially overrides priorities of the eligible producer NFs, and based on the tracked performance characteristic across the different timeslots, a producer NF to handle the SBI service request, and forwarding the SBI service request to the producer NF.

11. The system of claim 10 wherein the timeslot-based producer NF performance tracker is configured to track at least one of load, latency, and SBI request success rate of each of the producer NFs across the different timeslots.

12. The system of claim 10 wherein the producer NF selector, in selecting the producer NF, is configured to perform a lookup in the database for a record corresponding to a current timeslot, locate the record corresponding to the current timeslot, read producer NF identities and corresponding tracked values of the performance characteristic from the record, and select the producer NF from the producer NF identities in the record based on the tracked values of the performance characteristic in the record.

13. The system of claim 10 wherein the timeslot-based producer NF performance tracker is configured to learn expected values of the performance characteristic across the timeslots.

14. The system of claim 10 wherein the timeslot-based producer NF performance tracker is configured to identify eligible producer NFs to handle the SBI service request by:
transmitting an NF discovery request message to an NF repository function (NRF); and
receiving, from the NRF, an NF discovery response that includes NF profiles of the producer NFs eligible to handle the SBI service request.

15. The system of claim 14 wherein the timeslot-based producer NF performance tracker is configured to read, from the NF profiles, attribute values that indicate measurements of the performance characteristic.

16. The system of claim 15 wherein the producer NF selector is configured to select a producer NF in a manner that at least partially overrides the priorities of the eligible producer NFs by reading, from the NF profiles, priorities of the producer NFs and using the performance characteristic rather than the priorities from the NF profiles to select the producer NF to handle the SBI service request.

17. The system of claim 10 wherein the producer NF selector is configured to:
receive initial SBI requests having a first priority attribute value that is below an operator-defined threshold and initial SBI service requests having a second priority attribute value that is above the operator-defined threshold;
select producer NFs to process the initial SBI service requests having the first priority attribute value based on priorities of producer NFs received in an NFDiscover response and forwarding the initial SBI requests having the first priority attribute value to the selected producer NFs; and
select producer NFs to process the initial SBI service requests having the second priority attribute value based on the tracked performance characteristic for the producer NFs.

18. A non-transitory computer readable medium having stored thereon executable instructions that when executed by a processor of a computer control the computer to perform steps comprising:
at a service communication proxy (SCP):
tracking a performance characteristic of producer network functions (NFs) across different timeslots, wherein tracking the performance characteristic includes continually updating, by a tracking process, a value of the performance characteristic;
maintaining a database record for each of the timeslots, where each database record includes a value indicating the timeslot, a plurality of producer NF identifiers, and the value of the performance characteristic for each of the producer NF identifiers during the timeslot and database records for different timeslots include the same producer NF identifiers;
receiving, from a consumer NF, a service based interface (SBI) service request;
identifying eligible producer NFs capable of handling the SBI service request;
selecting, from the eligible producer NFs, in a manner that at least partially overrides priorities of the eligible producer NFs, and based on the tracked performance characteristic across the different timeslots, a producer NF to handle the SBI service request; and
forwarding the SBI service request to the producer NF.

* * * * *

UNITED STATES PATENT AND TRADEMARK OFFICE
CERTIFICATE OF CORRECTION

PATENT NO. : 12,022,316 B2
APPLICATION NO. : 17/356461
DATED : June 25, 2024
INVENTOR(S) : Srivastava et al.

Page 1 of 1

It is certified that error appears in the above-identified patent and that said Letters Patent is hereby corrected as shown below:

In the Specification

In Column 11, Line 52, delete "NRF" and insert -- NRF. --, therefor.

In the Claims

In Column 14, Lines 50-51, in Claim 9, delete "NFDis-cover" and insert -- NF Discovery --, therefor.

In Column 15, Line 2, in Claim 10, delete "value" and insert -- a value --, therefor.

Signed and Sealed this
Tenth Day of December, 2024

Katherine Kelly Vidal
*Director of the United States Patent and Trademark Office*